R. M. DOWNIE.
TRACTION WHEEL.
APPLICATION FILED MAY 27, 1913.

1,099,789.

Patented June 9, 1914.

WITNESSES

R. M. Downie
INVENTOR
BY
ATTORNEY

UNITED STATES PATENT OFFICE.

ROBERT M. DOWNIE, OF BEAVER FALLS, PENNSYLVANIA, ASSIGNOR TO KEYSTONE DRILLER COMPANY, OF BEAVER FALLS, PENNSYLVANIA.

TRACTION-WHEEL.

1,099,789.  Specification of Letters Patent.  Patented June 9, 1914.

Application filed May 27, 1913. Serial No. 770,230.

*To all whom it may concern:*

Be it known that I, ROBERT M. DOWNIE, a citizen of the United States, residing at Beaver Falls, in the county of Beaver and State of Pennsylvania, have invented a new and useful Traction-Wheel, of which the following is a specification.

The invention relates to improvements in traction wheels.

The movement on behalf of good roads, which has been inaugurated throughout the country, has caused considerable trouble with manufacturers of traction engines and in some cases county commissioners backed by legislation on the subject have prohibited the use of cleated wheels on improved roads. To get around this difficulty, I have devised a traction wheel equipped with removable cable chains, adapted to be conveniently carried, and capable when arranged in operative position on the tires of preventing the wheels of a traction engine from slipping and skidding on ice and other slippery or muddy surfaces, and when removed from the wheels of enabling the latter to present smooth tread surfaces to avoid injuring paved streets and improved roads.

Heretofore chains have been employed on traction wheels, but they have either been secured to the tire by means which render their removal exceedingly difficult and inconvenient and attended with the liability of the loss of parts when detached, or they have been wrapped continuously around the tire of the wheel. When applied in the latter manner, while being more convenient to remove and replace they pass around the side edges of the tire and are soon cut and destroyed.

The object of the present invention is to provide a traction wheel having a cable chain laced through holes in the face of the tire at points spaced from the side edges thereof, so that the chain will not project beyond the said edges of the tire to catch in ruts of the road and work their own destruction.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
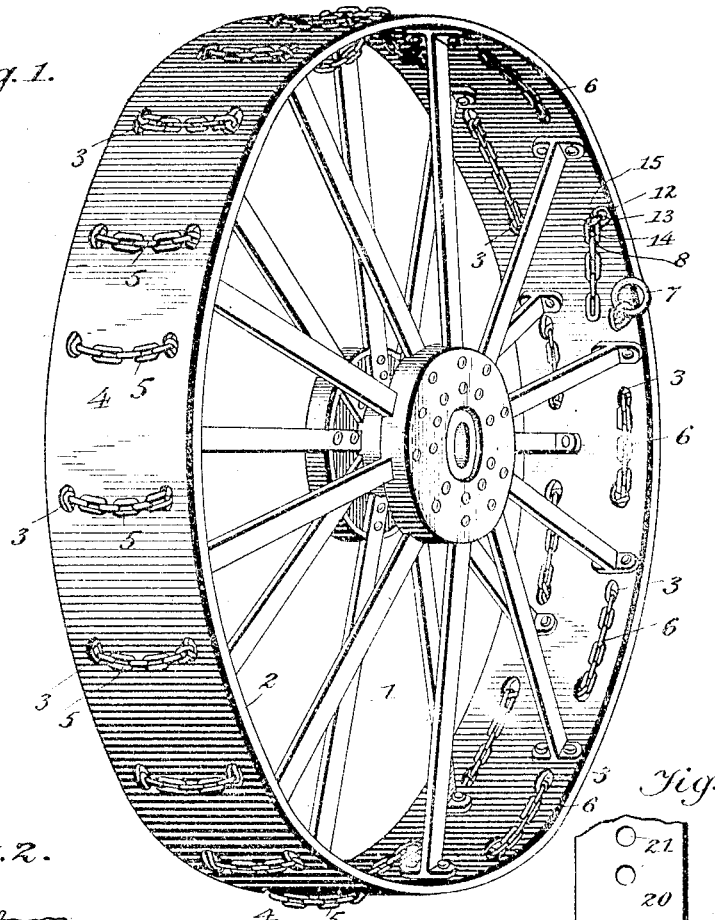
Figure 2:
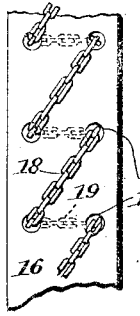
Figure 4:
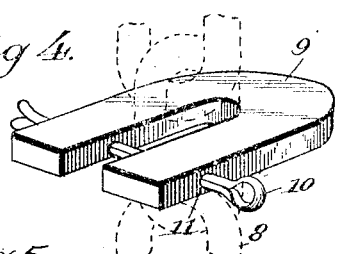
Figure 3:
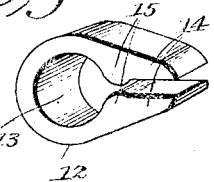
Figure 5:
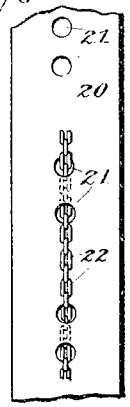

In the drawing:—Figure 1 is a perspective view of a traction wheel provided with a chain, constructed and arranged in accordance with the present invention. Fig. 2 is a plan view of a portion of the tire of a traction wheel, illustrating another arrangement of the chain. Fig. 3 is a similar view, illustrating the arrangement of the chain on the front or steering wheels. Fig. 4 is a detail perspective view of the clip for securing the free end of the chain. Fig. 5 is a similar view of a clamp for holding the free end of the chain.

Like numerals of reference designate corresponding parts in all the figures of the drawing.

In the accompanying drawing in which is illustrated the preferred embodiment of the invention, 1 designates a traction wheel of the ordinary construction having a tire 2 provided with transversely alined sets or pairs of holes 3 to permit a cable chain 4 of steel or other suitable material to be laced through them at points spaced from the side edges of the tire of the wheel, so that the cable chain will not project laterally beyond the tire at the side edges thereof and be cut or otherwise injured by the ruts in the surface over which a traction engine may be traveling. The chain, which is designed to be laced tightly through the openings 3, may consist of a single piece or a plurality of pieces, and it may be laced through the openings in a number of different ways to provide exterior engaging portions.

In Fig. 1 of the drawing, the chain 4 is laced through the openings 3 to form straight transverse exterior engaging portions 5, and the connecting portions 6 at the inner face of the tire extend longitudinally thereof from one set or pair of holes to the next set or pair. The chain is provided at one end with a ring 7 of greater diameter than the openings 3 to form a stop for preventing the end of the chain from pulling through the said opening, but any other suitable form of stop or anchoring means may, of course, be employed. The chain after being passed through one of the openings 3 of a pair from the interior of the tire is extended across or transversely of the exterior of the tire to the other hole of such pair, and is passed through the same from the exterior of the tire to the interior thereof and is then extended along the inner face of the tire in substantial parallelism with the side edges thereof to the corresponding hole of the next pair. It is then passed through such hole to the exterior of the tire and extended across the same to the other hole of such second set or pair, the operation being repeated until the entire outer face of the tire is provided at spaced points with the exterior engaging portions. While the chain is drawn tightly through the holes it is impossible with a chain of large size to have the stretches or portions perfectly taut and the wearing of the links will also operate to loosen and slacken the engaging portions of the chains.

The free end 8 of the chain may be secured at the inner face of the tire, as illustrated in Fig. 4, by means of an approximately U-shaped clip 9 straddling a link of the chain between two adjacent links and secured on the straddled link by means of a cotter pin 10, or other suitable fastening device passing though transversely alined perforations 11 of the sides of the clip. The cotter pin confines the clip on the link, and the adjacent links prevent the clip from sliding on the chain. A relatively light fastening device may be employed for securing the clip to the chain, as it is not subjected to any of the strain which may be placed on the chain. The free end of the chain may also be secured by means of a resilient clamp 12, shown in Fig. 5, and constructed of steel or other suitable material and consisting of a substantially circular body portion having a circular opening 13 to receive one side of a link and provided at one side with spaced projecting terminals 14 having inner rounded transverse enlargements 15 partially closing the space between the projecting terminals of the clamp and adapted to enable the latter to be readily passed over the side of a link in springing the clamp into and out of engagement with the same. Either the clamp or the clip may be employed, and they will enable the chain to be readily applied to and removed from the wheels of a traction engine, and when the chain is removed, they are adapted to be secured to the same, so that the chain may be conveniently transported with the traction engine without liability of losing any parts of the traction device.

In practice the chain will be put on the traction wheel in sections, that is to say, supposing the chain necessary for an entire wheel should be thirty feet, it would be cut into about three or more pieces, each length or section of the chain being equipped at one end with a large link or ring 7 and the other end with a clip. This will allow the chain to be put on the tire more conveniently, as it will only be necessary to lace some eight or ten feet of chain through the holes, whereas if the chain should be one piece, it would amount to pulling thirty feet of chain through the first or second hole in the tire, which is a much more laborious process than lacing with a shorter chain. Instead, however, of providing a fixed stop in the form of a large link or ring at one end of the chain, a clip or analogous fastening device may be employed at each end of the chain for detachably securing the same to the tire of the wheel.

In Fig. 2 of the drawing, is illustrated a traction wheel tire 16 having spaced openings 17 arranged in pairs and receiving a chain laced through the openings to form exterior diagonally disposed portions 18, the inner connecting portions 19 being disposed transversely of the inner face of the tire, as illustrated in dotted lines in Fig. 2, the transverse arrangement being preferable as the distance between the members of each pair of openings is less than the distance between the sets of openings, but the inner connecting portions of the chain may, of course, be disposed longitudinally of the tire at the inner face thereof in the manner illustrated in Fig. 1 of the drawing.

In Fig. 3 of the drawing is illustrated the tire 20 of one of the steering wheels of a traction engine. The tire is provided at intervals with sets of openings 21 arranged in pairs, the members of each pair being close together. The perforations 21 are arranged in a central circumferential series around the tire 20 and they enable the exterior portions 22 of a chain to form almost a continuous chain around the tire. The chain of the steering wheel is designed to take the place of the cutter band, which is shrunk on the ordinary steering wheel and which will damage a paved street or roadway as much as the cleats of an ordinary traction wheel.

What is claimed is:—

1. A traction wheel of the class described having a smooth tire provided with openings located between the side edges of the tire, and a detachable chain laced through the openings and having spaced exterior engaging portions and interior connecting portions, both of the said portions being located between the side edges of the tire.

2. A traction wheel of the class described having a smooth tire provided with openings located between the side edges of the tire, a chain laced through the openings and having spaced exterior engaging portions and interior connecting portions located, respectively, at the outer and inner faces of the tire and arranged between the side edges thereof, and means connected with the ends of the chain for detachably securing the latter on the tire of the wheel, whereby the chain is adapted to be removed to enable the tire to present a smooth tread surface.

3. A traction wheel of the class described having a smooth tire provided with openings located between the side edges of the tire, a detachable chain laced through the openings and having exterior engaging portions and interior connecting portions located, respectively, at the outer and inner faces of the tire and arranged between the side edges thereof, a stop or anchor of greater diameter than the said openings permanently applied to one end of the chain, and a removable device secured to the other end of the chain and engaging the adjacent links thereof.

4. A traction wheel of the class described having a smooth tire provided with openings located between the side edges of the tire, a chain laced through the openings and having exterior engaging portions and interior connecting portions located, respectively, at the outer and inner faces of the tire and arranged between the side edges thereof, and means for detachably securing the chain to the tire including a resilient clamp straddling a link of the chain and being of a size greater than the diameter of the said opening to prevent the chain from being pulled through the same.

5. A traction wheel of the class described having a smooth tire provided with openings located between the side edges of the tire, a chain laced through the openings and having exterior engaging portions and interior connecting portions located, respectively, at the outer and inner faces of the tire and arranged between the side edges thereof, and means for detachably securing the chain to the tire including a resilient clamp consisting of a substantially circular body having an opening to receive one of the sides of a link of the chain, said clamp being provided at one side of the body with spaced projecting portions having ribs or enlargements at their inner faces.

6. A traction wheel of the class described having a smooth tire provided at intervals with transversely alined openings arranged in pairs and spaced from the side edges of the tire, and a detachable chain laced through the said openings and having spaced engaging portions located on the outside of the tire and extending between the said openings, said chain also having connecting portions arranged at the inner face of the tire between the said openings, both of said portions being located between the side edges of the tire.

In testimony, that I claim the foregoing as my own, I have hereto affixed my signature in the presence of two witnesses.

ROBERT M. DOWNIE.

Witnesses:
J. WALKER WILSON,
WILL R. COOK.